(12) United States Patent  
Nagura (10) Patent No.: US 7,648,288 B2  
(45) Date of Patent: Jan. 19, 2010

(54) OPTICAL TRANSMISSION DEVICE AND ELECTRONIC EQUIPMENT WITH USE THEREOF

(75) Inventor: Kazuhito Nagura, Kashihara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 11/947,093

(22) Filed: Nov. 29, 2007

(65) Prior Publication Data

US 2008/0131143 A1 Jun. 5, 2008

(30) Foreign Application Priority Data

Nov. 30, 2006 (JP) .............................. 2006-323469

(51) Int. Cl.
*G02B 6/42* (2006.01)
(52) U.S. Cl. .............................. 385/92; 385/88; 385/89
(58) Field of Classification Search ........................ None
See application file for complete search history.

(56) References Cited

U.S. PATENT DOCUMENTS

| | | | | |
|---|---|---|---|---|
| 5,230,030 A | * | 7/1993 | Hartman et al. ................ | 385/50 |
| 5,359,686 A | * | 10/1994 | Galloway et al. .............. | 385/49 |
| 5,369,529 A | * | 11/1994 | Kuo et al. ..................... | 359/858 |
| 5,473,716 A | * | 12/1995 | Lebby et al. .................. | 385/54 |
| 6,181,854 B1 | | 1/2001 | Kojima et al. | |
| 6,433,942 B1 | * | 8/2002 | Memezawa et al. .......... | 359/833 |
| 7,182,522 B2 | * | 2/2007 | Sasaki et al. ................... | 385/53 |
| 2001/0004413 A1 | * | 6/2001 | Aihara .......................... | 385/88 |
| 2007/0206907 A1 | | 9/2007 | Mizoguchi et al. | |
| 2008/0205826 A1 | * | 8/2008 | Harano et al. ................. | 385/88 |

FOREIGN PATENT DOCUMENTS

| | | | |
|---|---|---|---|
| JP | 6-140106 A | | 5/1994 |
| JP | 7-16381 U | | 3/1995 |
| JP | 2000-98188 A | | 4/2000 |
| JP | 2002-182070 A | | 6/2002 |
| JP | 2004-264543 | | 9/2004 |
| JP | 2006-350213 A | * | 12/2006 |
| JP | 2002-267358 A | | 10/2007 |
| JP | 2007-287358 A | | 10/2007 |
| WO | WO 2006/080105 A1 | * | 8/2006 |

* cited by examiner

*Primary Examiner*—Mike Stahl
(74) *Attorney, Agent, or Firm*—Birch, Stewart, Kolasch & Birch, LLP (57) ABSTRACT

An optical transmission device of the invention has an optical transmitter unit 1 in which a light emitting element and a light receiving element are sealed with resin by transfer molding, and a holder 2 which holds the optical transmitter unit 1 being contained therein and which holds an optical plug being fitted therein with an optical fiber cable fixed to the optical plug. The holder 2 holds the optical plug that has been inserted from a direction generally at right angles to optical axes of the optical transmitter unit 1. The optical transmission device can easily be mounted on a printed board without necessity of a dead area for insertion/extraction of optical plug and can be small in size and thickness.

9 Claims, 13 Drawing Sheets

OPTICAL TRANSMISSION DEVICE AND ELECTRONIC EQUIPMENT WITH USE THEREOF

CROSS-REFERENCE TO RELATED APPLICATIONS

This nonprovisional application claims priority under 35 U.S.C. §119(a) on Patent Application No(s). 2006-323469 filed in Japan on Nov. 30, 2006, the entire contents of which are hereby incorporated by reference.

BACKGROUND OF THE INVENTION

The present invention relates to an optical transmission device and particularly to an optical transmission device suitable for interconnection in a portable electronic equipment that is small in size and elevation and that is indispensably adapted to surface mount.

Conventionally, optical transmission devices that use optical fiber cables as transmission media have a structure in which a fit position is determined and held by a plurality of outline surfaces of an optical plug. As examples of prior arts, optical transmission devices that are applied also to portable electronic equipment of consumer appliances will be described hereinbelow. In addition, reference will be made to a stacking-type electrical connector and an optical/electrical hybrid type plug connector.

Figure 6:
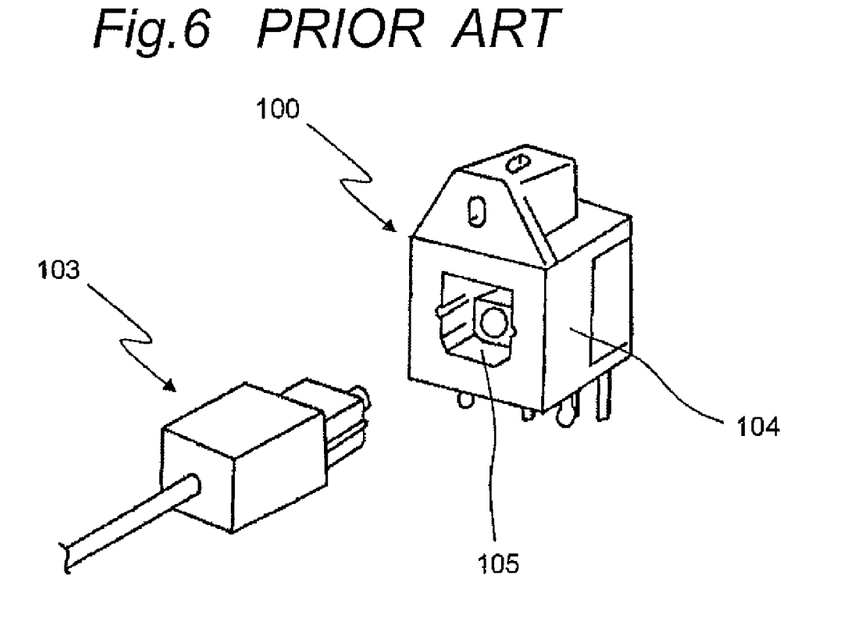
FIG. 6 is a general perspective view of an optical transmission device and an optical plug of a first prior art.
Figure 7:
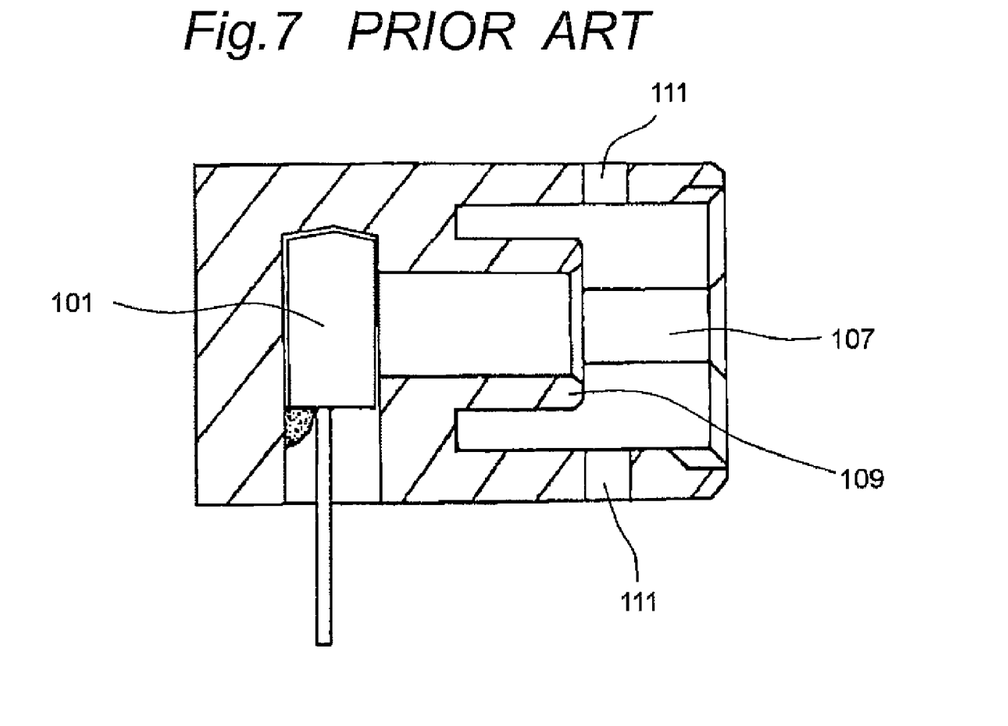
FIG. 7 is a sectional view of the optical transmission device.
Figure 8:
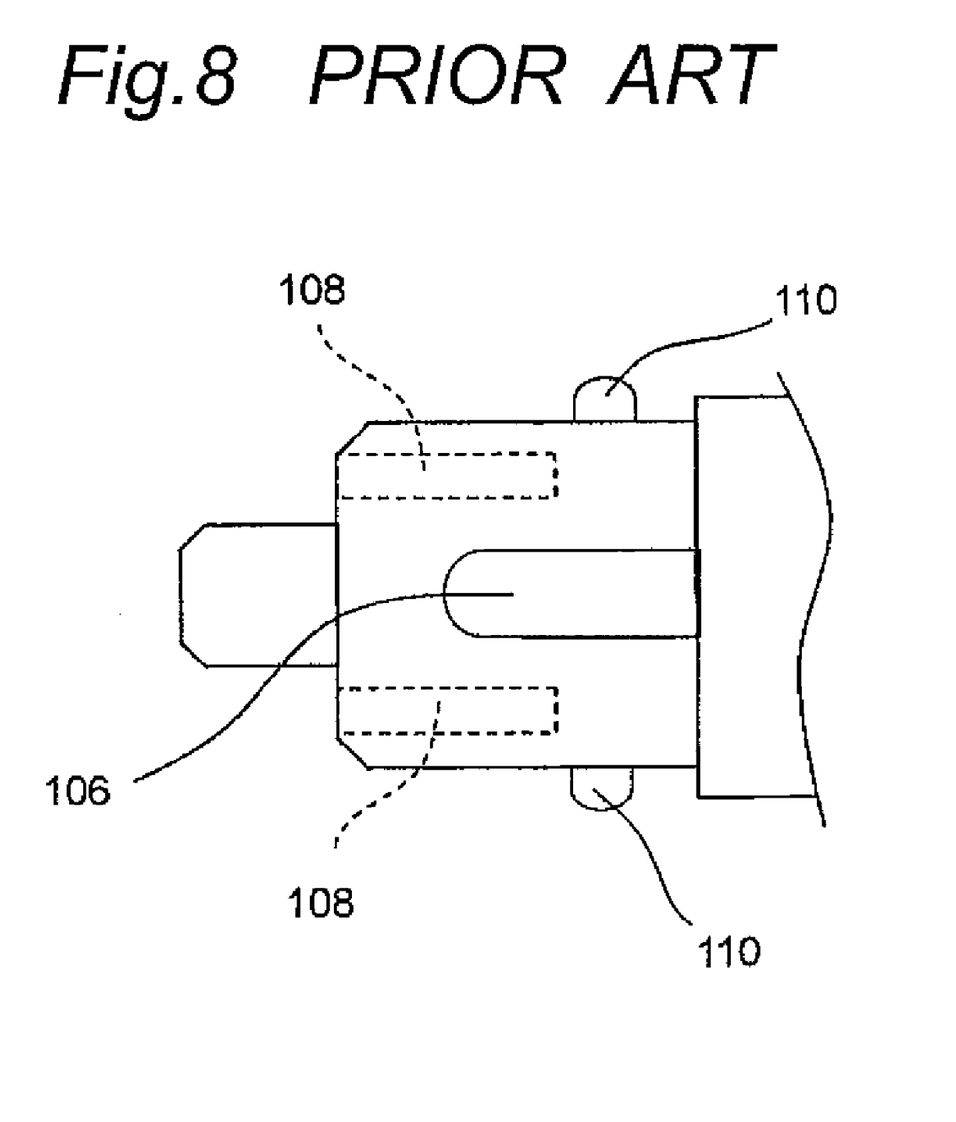
FIG. 8 is a sectional view of the optical plug.

Listed as a first prior art is an optical audio connector shown in FIGS. 6 through 8 (see JP H06-140106 A, for example). FIG. 6 shows a general view of an optical audio connector 100 and an optical plug 103, FIG. 7 shows a sectional view of the optical audio connector 100, and FIG. 8 shows a sectional view of the optical plug 103.

As shown in FIG. 7, a light emitting device 101 (or a light receiving device) is housed in a holder 104 in which a mechanism for holding the optical plug 103 fitted therein is provided. In the holder 104 is provided a hole 105 (shown in FIG. 6) for holding the optical plug 103 fit therein in a direction of an optical axis of the light emitting device 101. In this mechanism, the optical plug 103 is inserted into the hole 105 in the optical audio connector 100 in the direction of the optical axis of the light emitting device 101, so that the optical plug 103 is fitted and held in a specified position. On this occasion, protrusions 106 (shown in FIG. 8) provided on side surfaces of the optical plug 103 are guided into grooves 107 provided on inner side surfaces of the hole 105 (shown in FIG. 6) in the holder 104, so that positioning in a vertical direction and in a direction of the side surfaces is established. Besides, recesses 108 (shown in FIG. 8) provided in distal end part of the optical plug 103 are guided on and collide with protrusions 109 provided on a bottom surfaces in the hole 105 of the holder 104, so that positioning in a direction of depth thereof is established. Furthermore, protrusions 110 (shown in FIG. 8) provided on top and bottom surfaces of the optical plug 103 are fitted and held in pits 111 provided on top and bottom surfaces inside the hole 105 of the holder 104. In order to fit and hold the optical plug 103 in the holder 104, therefore, the holder 104 has to be provided so as to cover the top and bottom surfaces and both the side surfaces of the optical plug 103.

Figure 9:
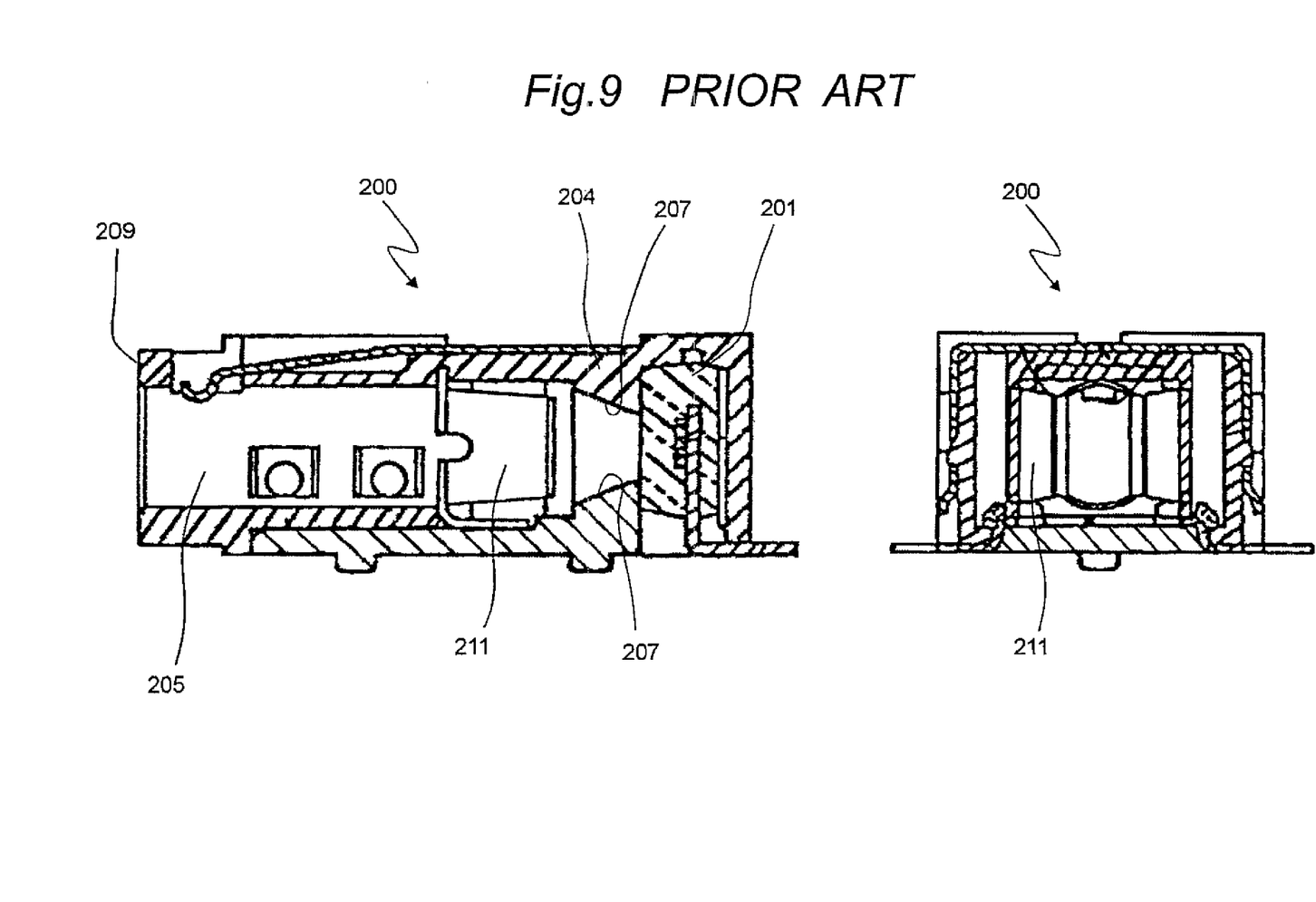
FIG. 9 is a sectional view of an optical connector for portable audio equipment of a second prior art.
Figure 10:
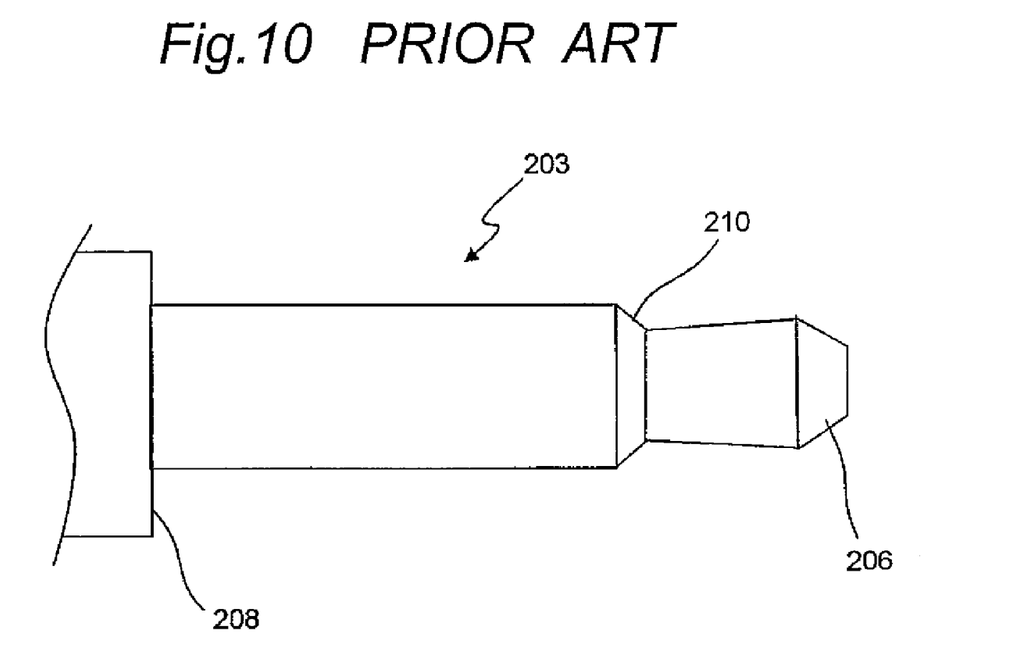
FIG. 10 is an external view of an optical plug that is to be connected to the optical connector for portable audio equipment.

Listed as a second prior art is an optical connector for portable audio equipment shown in FIGS. 9 and 10 (see JP H06-140106 A, for example). FIG. 9 shows a sectional view of the optical connector 200 for portable audio equipment and FIG. 10 shows an external view of an optical plug.

As shown in FIG. 9, a light emitting device 201 (or a light receiving device) is housed in a holder 204 in which a mechanism for holding the optical plug 203 fitted therein is provided. In the holder 204 is provided a hole 205 for holding the optical plug 203 fitted therein in a direction of an optical axis. In this mechanism, the optical plug 203 is inserted into the hole 205 in the direction of the optical axis of the light emitting device 201, so that the optical plug 203 is fitted and held in a specified position. On this occasion, tapered part 206 provided at distal end of the optical plug 203 is guided into cone-like guide part 207 provided in the holder 204, so that positioning in a direction perpendicular to the optical axis is established. In addition, a step 208 provided at root of the optical plug 203 collides with a wall 209 of the holder 204 in which the hole 205 is provided, so that positioning in the direction of the optical axis is established. Furthermore, constricted part 210 of the optical plug 203 is pressed and held by metal pieces 211 that have spring ability and that are provided in the hole 205 of the holder 204. In order to fit and hold the optical plug 203 in the holder 204, therefore, the holder 204 has to be provided so as to cover the tapered distal end part 206 of the optical plug 203 and a whole volume of the plug 203.

Figure 11A:
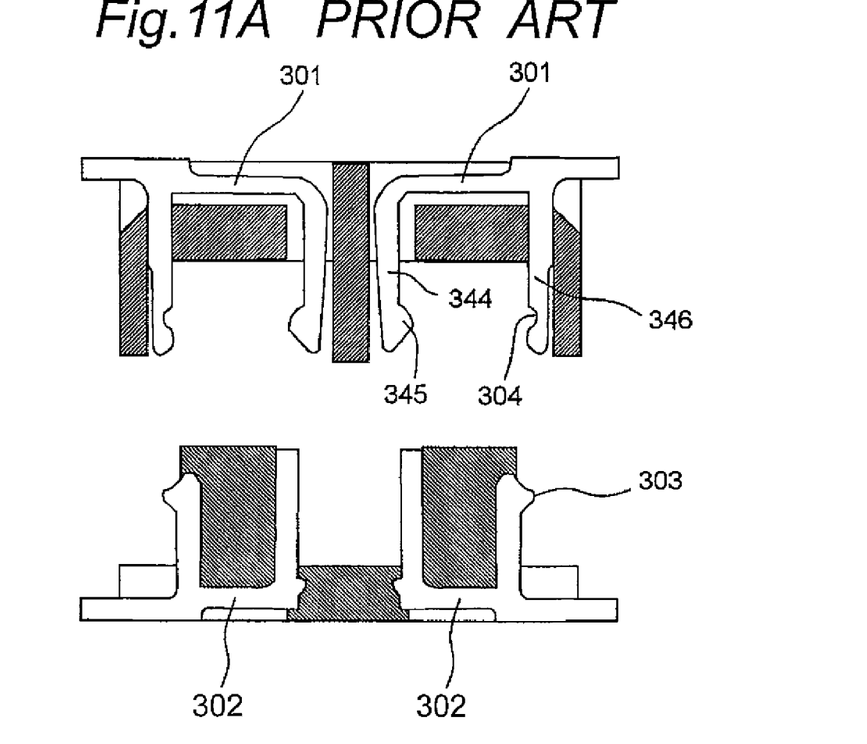
FIG. 11A is a sectional view showing a stacking-type electrical connector of a third prior art in a state prior to fitting.
Figure 11B:
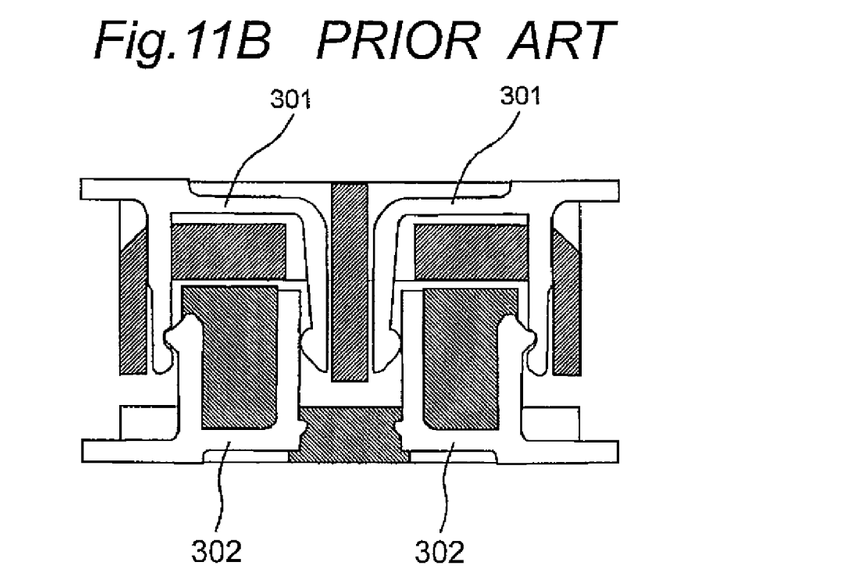
FIG. 11B is a sectional view showing the stacking-type electrical connector in a state posterior to fitting.

Listed as a third prior art is a stacking-type electrical connector shown in FIGS. 11A and 11B (see JP H07-16381 U, for example).

In the stacking-type electrical connector, as shown in FIG. 11A, paired contacts are rubbed by fitting against each other so as to acquire electrical contact. Contacts 301 on one side of the paired contacts are each bifurcated into plate-like distal end parts having elasticity in a direction of thickness thereof, and contacts 302 on the other side are shaped so as to fit in inside of the bifurcated parts.

A branch 344 in the bifurcated part of the contact 301 on one side has electrical contact part 345 on inside of the bifurcated part and is thereby brought into electrical contact with the contact 302 on the other side. Between the other branch 346 in the bifurcated part of the contact 301 and the contact 302 on the other side is provided a lock mechanism composed of a combination of a protrusion 303 and a recess 304 into which the protrusion 303 is to fall.

In the stacking-type electrical connector, as shown in FIG. 11B, the protrusion 303 can be prevented from easily slipping out of the recess 304, by a structure in which the bifurcated contact 301 on one side elastically pinches the contact 302 on the other side and in which the protrusion 303 falls into the recess 304.

Figure 12:
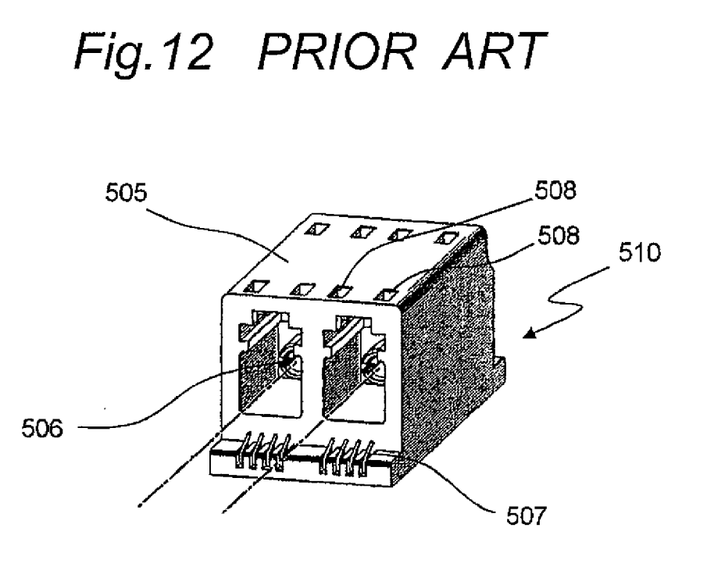
FIG. 12 is a perspective view of a connector of a fourth prior art.
Figure 13:
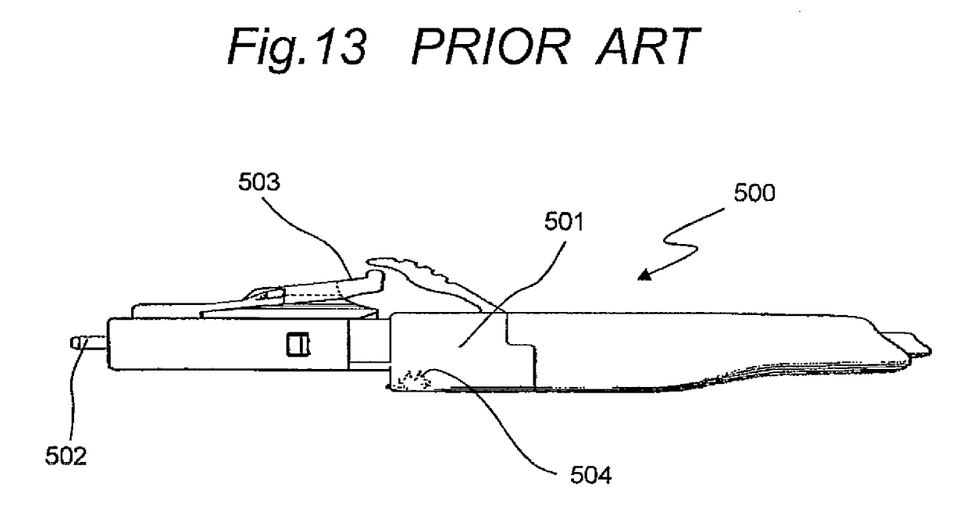
FIG. 13 is a side view of a plug that is to be connected to the connector.

Listed as a fourth prior art is an optical/electrical hybrid type plug connector shown in FIGS. 12 and 13 (see LP 2002-182070 A, for example).

As shown in FIG. 12, a connector 510 has a receptacle 505 into which two plugs 500 can be connected. As shown in FIG. 13, the plug 500 is composed of a fiber support device 502 for supporting an optical fiber extending through a front opening of an insulator housing 501, a cantilever latch 503 provided on upper part of the insulator housing 501, and metal blades 504 provided on bottom surface side of the insulator housing 501.

The cantilever latch 503 is a mechanism that lockably meshes with the receptacle 505 to be connected thereto. The optical/electrical hybrid type plug connector is suitable for high-density panel mounting because the cantilever latch 503 is placed on top of the insulator housing 501 and because electrical connection device 504 is placed on the bottom surface side of the insulator housing 501. Such a structure prevents interference of the latching structure with left and right sides of the plug connector. In fact, this jack structure has receptacles that are spaced (arranged) at small interval and that can be used for high-density application, because only minimum spaces are required between side surfaces thereof.

In the receptacle 505 are provided a hole 506 for holding the fiber support device 502 provided in the plug, terminals 507 to which the metal blades 504 are to be electrically connected, and lock holes 508 for holding the cantilever latch 503 fitted therein.

The fit of the plug connector is achieved by movement of the fiber in the axial direction. The plug connector is designed so that the fiber support device 502 enters the receptacle 505 before electrical plug components (504, 507) are engaged, and thus an LC type optical plug that does not have the metal blades 504 can also be fitted in and held by the receptacle.

As described above, the first and second prior arts require the holder that is configured so as to cover an outside shape of the optical plug. Such a configuration is a great restriction on size reduction and requires the optical plug to be inevitably moved in the direction of the optical axis of the optical fiber when the optical plug is inserted into or extracted from the holder. Thus an area larger than the optical plug in length is required on a printed board in order that the optical plug is inserted into or extracted from the holder, and any components cannot be placed at all in the area. Therefore, the optical transmission devices of the first and second prior arts are not suitable for portable electronic equipment, which has been being decreased in size and thickness.

In the third prior art, electrical connection and fitting can be achieved by a small and thin configuration, whereas the prior art provides a mechanism only for implementing electrical contacts and does not provide a mechanism for precisely positioning the plug connector necessary for optical connection, a mechanism for holding the plug connector with a fit, and the like.

The fourth prior art provides the optical/electrical hybrid plug connector, which has a structure having the metal blades for electrical contacts provided in a part of the optical plug, and the plug is inserted in the direction of the optical axis of the optical fiber as in the first and second prior arts. Therefore, the fourth prior art is not suitable for portable electronic equipment, which has been being decreased in size and thickness.

SUMMARY OF THE INVENTION

An object of the present invention is to provide an optical transmission device that can easily be mounted on a printed board without necessity of dead area for insertion/extraction of an optical plug and that can be small in size and thickness and to provide electronic equipment with use of the device.

In order to achieve the above object, there is provided an optical transmission device comprising:

an optical transmitter unit in which at least either of a light emitting element and a light receiving element are sealed with resin by transfer molding, and a holder which holds the optical transmitter unit being contained therein and which holds an optical plug being fitted therein with an optical fiber cable fixed to the optical plug, the optical plug being inserted into the holder from a direction generally at right angles to optical axes of the optical transmitter unit.

In the optical transmission device having the above configuration, the holder that holds the optical transmitter unit being contained therein in which at least either of the light emitting element and the light receiving element are sealed with resin by transfer molding holds the optical plug being fitted therein with the optical fiber cable fixed to the optical plug. On condition that the optical transmission device has been mounted on a printed board so that the direction of the optical axes is parallel to a mount surface, for example, the optical plug can be inserted and extracted in the direction generally at right angles to the mount surface of the printed board, because the optical plug is inserted into the holder from the direction generally at right angles to the direction of the optical axes of the optical transmitter unit. Accordingly, the area for insertion/extraction of the optical plug is not required on the printed board. As a result, there can be provided the optical transmission device that can easily be mounted on a printed board without necessity of the dead area for insertion/extraction of the optical plug and that can be small in size and thickness.

In one embodiment of the invention, the optical transmission device further comprises:

recessed receivers that are provided in the holder so as to be suited to shapes of distal end parts of the optical plug, and recesses or protrusions provided on the holder that fit in protrusions or recesses of optical plug side provided on the distal end parts of the optical plug, wherein, upon insertion of the optical plug into the holder from the direction generally at right angles to the direction of the optical axes of the optical transmitter unit, optical axes of the optical plug coincide with the optical axes of the optical transmitter unit as a result of fitting the distal end parts of the optical plug in the recessed receivers of the holder, and the optical plug is set in a specified position in the direction of the optical axes as a result of fitting the recesses or protrusions on the holder in the protrusions or recesses of the optical plug side provided on the distal end parts of the optical plug.

When the optical plug is inserted into the holder from the direction generally at right angles to the direction of the optical axes of the optical transmitter unit in the embodiment, the optical axes of the optical plug coincide with the optical axes of the optical transmitter unit and positioning of the optical plug in the direction at right angles to the optical axes of the optical transmitter unit can be established as a result of fitting the distal end parts of the optical plug in the recessed receivers of the holder. In addition, positioning can be established in a specified position in the direction of the optical axes of the optical plug as a result of fitting the protrusions (or the recesses) of the optical plug side provided on the distal end parts of the optical plug in the recesses (or the protrusions) of the holder.

In one embodiment of the invention, holding recesses or holding protrusions are provided on the holder so as to fit protrusions or recesses of optical plug side provided on at least a portion of side surfaces of the optical plug and so as to hold the optical plug.

In the embodiment, the holding recesses (or the holding protrusions) provided on the holder fit the protrusions (or the recesses) of the optical plug side provided on at least a portion of the side surfaces of the optical plug and thereby hold the optical plug, so that the optical plug inserted from the direction generally at right angles to the direction of the optical axes of the optical transmitter unit can easily be held.

In one embodiment of the invention, metal members for fixing the holder onto a printed board by soldering are provided in the holder.

In the embodiment, the holder can be fixed by soldering onto the printed board via the metal members provided in the holder, and thus workability in the mounting on the board is improved.

In one embodiment of the invention, there is provided an electronic equipment using the optical transmission device.

The electronic equipment having an above configuration can be small in size and thickness with use of any one of the optical transmission devices.

Pursuant to the optical transmission devices of the invention, as apparent from the above, there can be provided the optical transmission device that can easily be mounted on printed board without the necessity of the dead area for the insertion/extraction of the optical plug and that can be small in size and thickness.

Pursuant to the electronic equipment of the invention, electronic equipment that can be small in size and thickness can be provided by using the optical transmission device.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Hereinbelow, optical transmission devices of the invention and electronic equipment with use thereof will be described in detail with reference to embodiments shown in the drawings.

Figure 1:
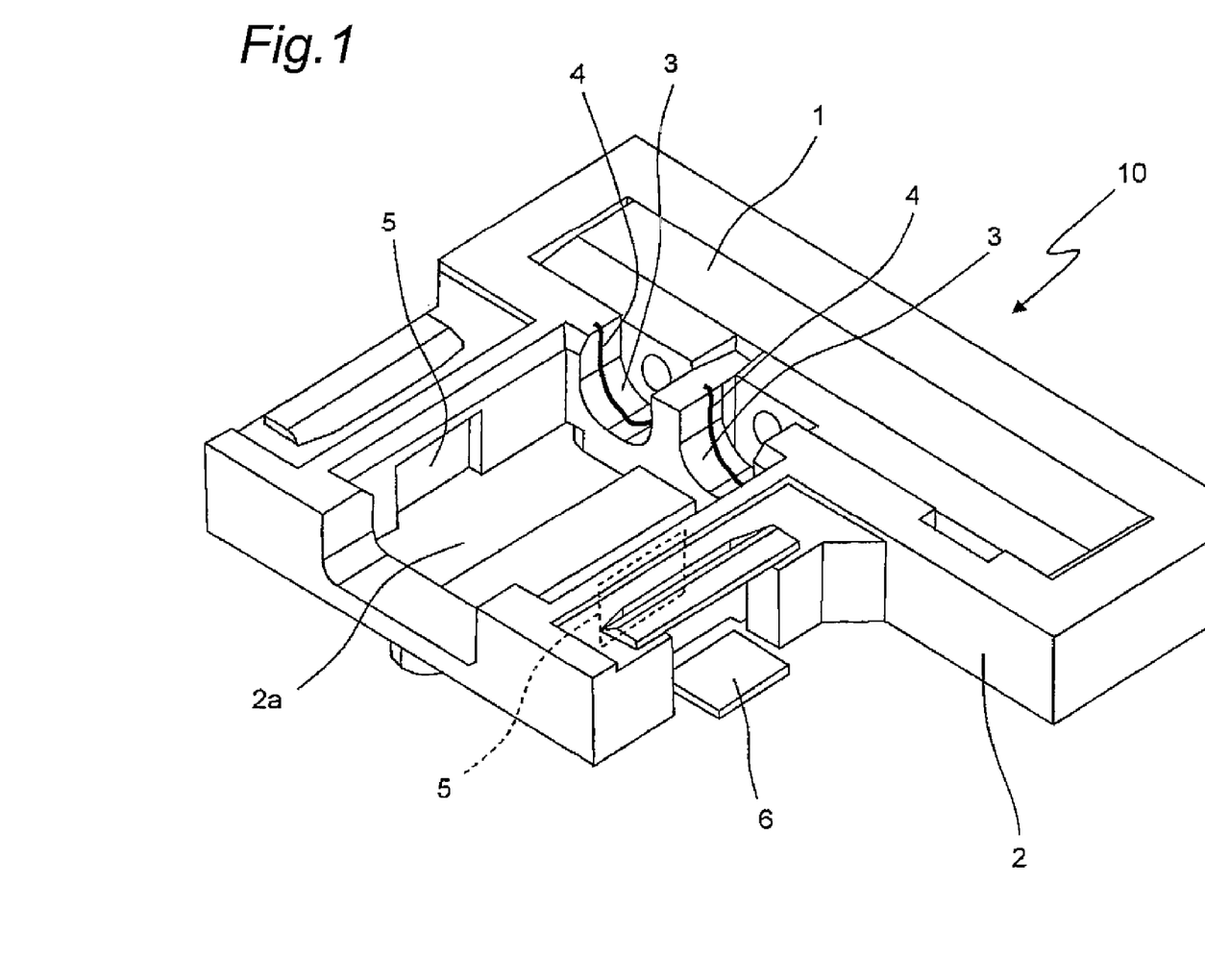
FIG. 1 is a perspective view of an optical transmission device according to an embodiment of the invention.
Figure 2:
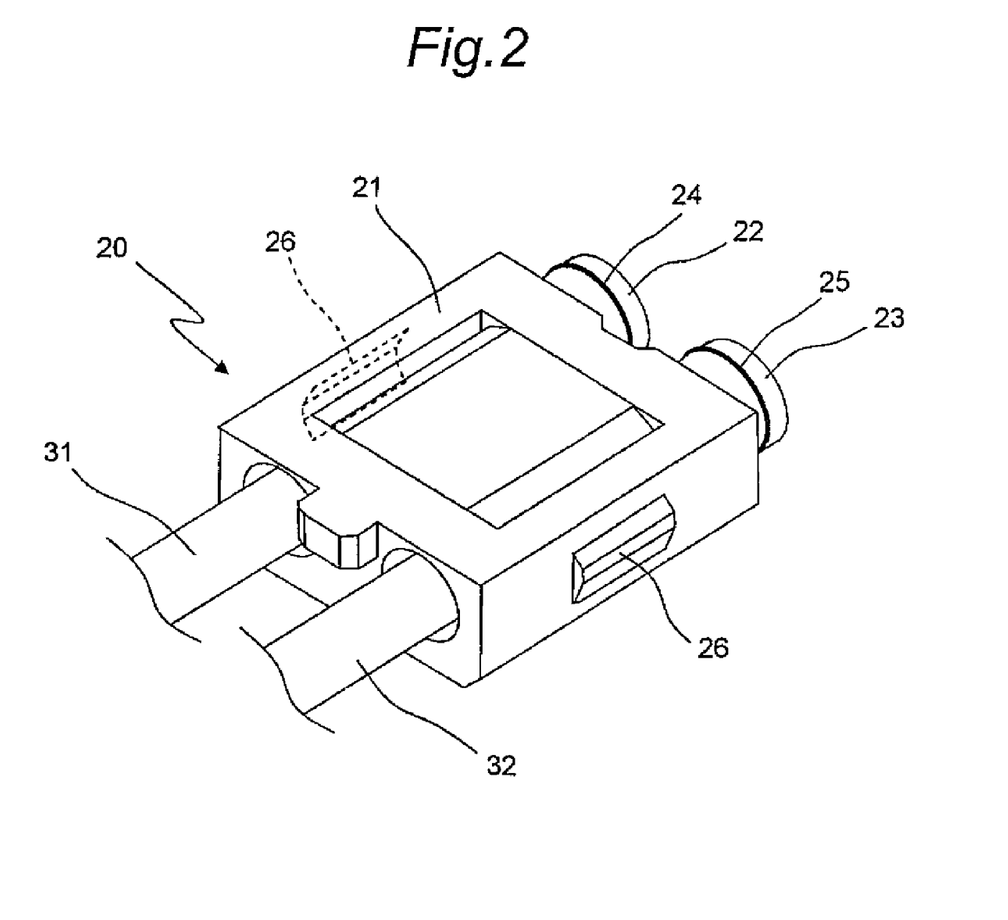
FIG. 2 is a perspective view of an optical plug that is to be connected to the optical transmission device.

FIG. 1 shows a perspective view of an optical transmission device according to an embodiment of the invention and FIG. 2 shows a perspective view of an optical plug that is to be connected to the optical transmission device.

As shown in FIG. 1, the optical transmission device 10 has an optical transmitter unit 1 and a holder 2 in which the optical transmitter unit 1 is fitted and held. In the optical transmitter unit 1, a light emitting element, a light receiving element, and a signal processing circuit that are not shown are sealed with resin by transfer molding.

In the holder 2, optical-plug receivers 3, 3 as an example of recessed receivers are provided so as to correspond to an optical axis for light receiving and an optical axis for light emitting in the optical transmitter unit 1, and a holding recess 2a communicating with the optical-plug receivers 3, 3 is provided opposite to the optical transmitter unit 1 with respect to the optical-plug receivers 3, 3. On the optical-plug receivers 3, 3 are provided annular grooves 4, 4 as an example of recesses. Holding recesses 5, 5 are provided at two sites on inner side surfaces of the holder 2. On back of the sites where the holding recesses 5, 5 are formed, metal plates 6 are placed as an example of metal members. With use of the metal plates 6, the holder 2 is fixed by soldering to a printed board (not shown).

As shown in FIG. 2, the optical plug 20 has a main body 21 to one end of which two optical fibers 31, 32 generally parallel to each other are connected, and generally cylindrical distal end parts 22, 23 protruding from the other end of the main body 21 in a direction of optical axes of the optical fibers 31, 32. Annular protrusions 24, 25 of the optical plug side are provided on outer circumferences of the distal end parts 22, 23, respectively, and protrusions 26, 26 of the optical plug side are provided partially on both side surfaces of the main body 21.

Subsequently, a mechanism for fitting the optical plug 20 in the holder 2 of the optical transmission device 10 and holding the optical plug will be described.

The optical plug 20 is pressed into the holding recess 2a of the holder 2 in a direction generally at right angles to the optical axes of the optical transmitter unit 1 and from socket side of the optical-plug receivers 3, 3 (from upside in FIG. 1). In this operation, the distal end parts 22, 23 of the optical plug 20 are fitted into the optical-plug receivers 3, 3 of the holder 2, and the annular protrusions 24, 25 of the optical plug side that are provided on the distal end parts 22, 23 of the optical plug 20 are fitted into the annular grooves 4, 4 provided on the optical-plug receivers 3, 3. Besides, the protrusions 26, 26 of the optical plug side that are provided on both the side surfaces of the optical plug 20 are fitted into the holding recesses 5, 5 of the holder 2. As a result, the optical plug 20 is fitted and held in a predetermined position in the holder 2.

Specifically, the distal end parts 22, 23 of the optical plug 20 are supported by the optical-plug receivers 3, 3 provided in the holder 2, so that a position of the optical plug 20 is fixed in the direction at right angles to the optical axis of the optical transmitter unit 1. Concurrently, the annular protrusions 24, 25 of the optical plug that are provided on the distal end parts 22, 23 of the optical plug 20 are supported by the annular grooves 4, 4 on the optical-plug receivers 3, 3 provided in the holder 2, so that the optical plug 20 is fixed at a specified position in the direction of the optical axes. Furthermore, the protrusions 26, 26 of the optical plug side that are provided on both the side surfaces of the optical plug 20 are fitted into the holding recesses 5, 5 provided in the holder 2, and the metal plates 6 placed on back surfaces of the holder 2 take up elastic forces from the protrusions 26, 26, so that the optical plug 20 is fitted in and held.

Figure 3:
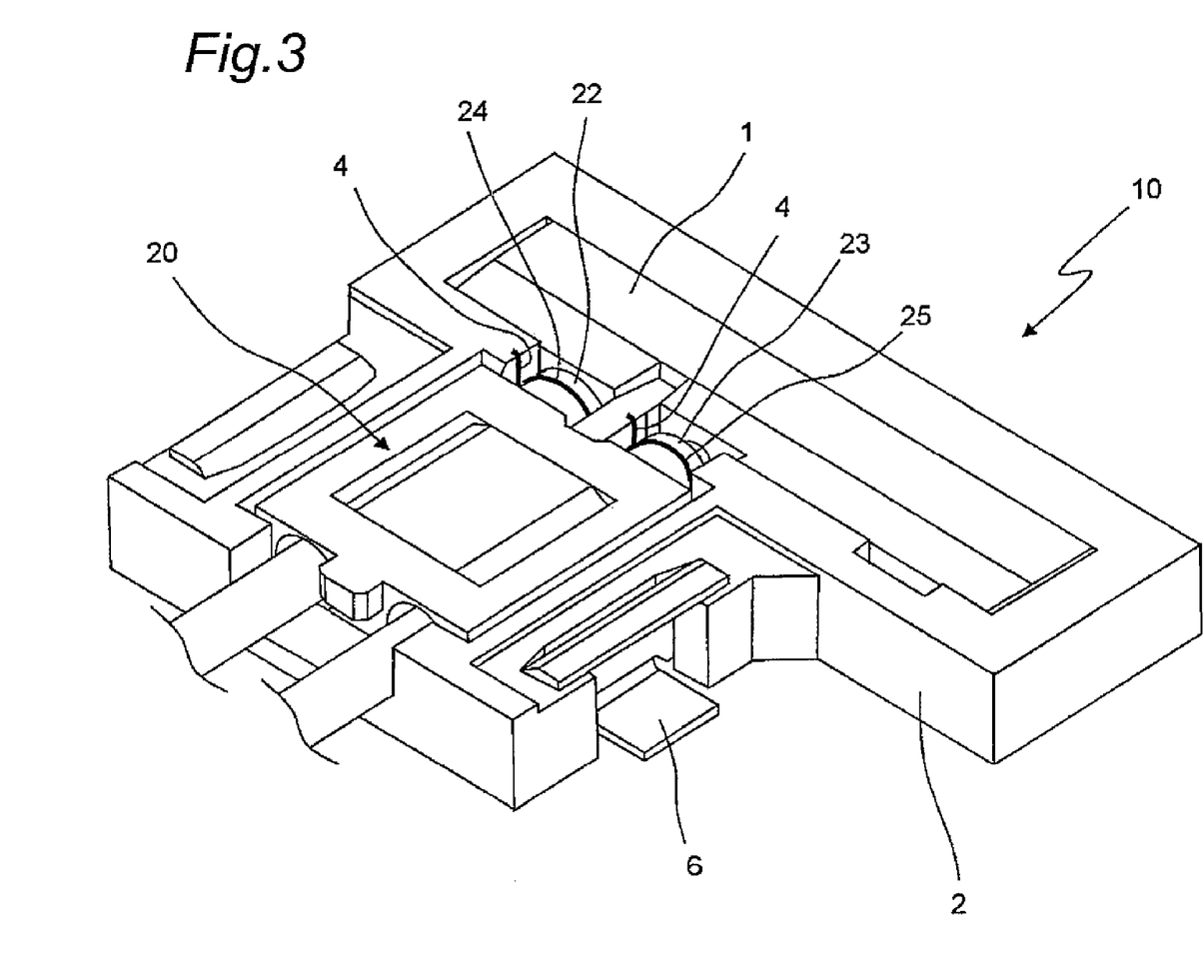
FIG. 3 is a perspective view showing a state in which the optical plug is fitted in the optical transmission device.

FIG. 3 shows a state in which the optical plug 20 is fitted in the optical transmission device 10. As shown in FIG. 3, the optical plug 20 is pressed against the holder 2 in the direction generally at right angles to the optical axes of the optical transmitter device 10 (from upside in FIG. 3) so that the distal end parts 22, 23 of the optical plug 20 are fitted in the optical-plug receivers 3, 3 of the holder 2, so that the annular protrusions 24, 25 of the optical plug side provided on the distal end parts 22, 23 of the optical plug 20 are fitted in the annular grooves 4, 4 provided on the optical-plug receivers 3, 3 of the holder 2, and until the protrusions 26, 26 (shown in FIG. 2) of the optical plug side that are provided on both the side surfaces of the optical plug 20 are fitted in the holding recesses 5, 5 placed on the side surfaces of the holder 2. Consequently, the optical plug 20 is held by the holder 2. In this state, a mechanism in which the metal plates 6 take up elastic deformation that the optical plug 20 exerts on the side surfaces of the holder 2 provides forces that continue to hold the optical plug 20.

Figure 4A:
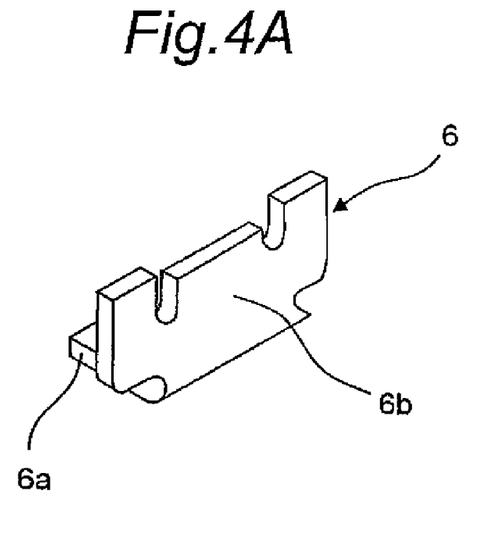
FIG. 4A is a perspective view of a metal plate in the optical transmission device.
Figure 4B:
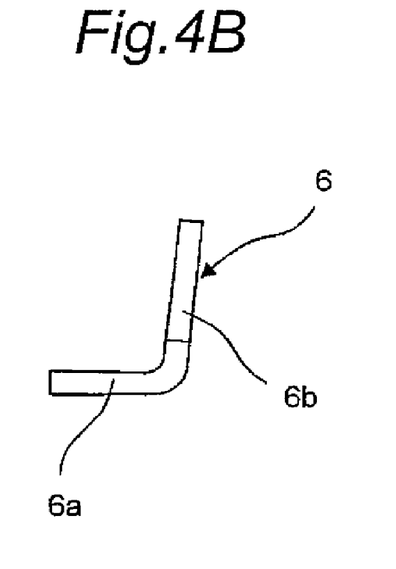
FIG. 4B is a side view of the metal plate in the optical transmission device.

As shown in FIG. 4, the metal plates 6 placed on the back surfaces of the holder 2 (shown in FIG. 1) each has a base part 6a that is to be soldered on a printed board (not shown) and a bent part 6b that extends with a bend from the base part 6a. In terms of a structure of the holder 2, the elastic deformation that the optical plug 20 causes and exerts on the sides of the holder 2 acts on upper part of the holder 2. This is because a beam placed in lower part of the holder 2 make the elastic deformation more remarkable in the upper part than in the lower part. In order to take up the elastic deformation that the optical plug 20 causes and exerts on the sides of the holder 2, therefore, the bent part 6b in upper part of the metal plate 6 is tilted inward with respect to the optical plug 20 (toward the holding recess 2a) rather than being square to the surface to be soldered onto the board.

In order that the optical plug 20 may be fitted in and held by the holder 2, the optical plug 20 has only to be pressed against the holder 2 in the direction generally at right angles to the optical axes of the optical transmitter unit 1 and from the socket side of the optical-plug receivers 3, 3 so that the distal end parts 22, 23 of the optical plug 20 are fitted in the optical-plug receivers 3, 3 of the holder 2, so that the annular protrusions 24, 25 of the optical plug side provided on the distal end parts 22, 23 of the optical plug 20 are fitted in the annular grooves 4, 4 on the optical-plug receivers 3, 3 of the holder 2, and until the protrusions 26, 26 of the optical plug side that are provided on both the side surfaces of the optical plug 20 are fitted in the holding recesses 5, 5 of the holder 2. The optical plug 20 being inserted and extracted is moved in the direction generally at right angles to a mount surface of the printed board, and the movement eliminates the necessity of the dead space on the printed board and thus does not hinder high-density mounting onto the printed board.

The positions of the optical plug 20 in the direction at right angles to the optical axes of the optical transmitter unit 1 and in the direction of the optical axes are determined with the distal end parts 22, 23 of the optical plug 20 supported by the optical-plug receivers 3, 3 of the holder 2 and with the annular protrusions 24, 25 of the optical plug side provided on the distal end parts 22, 23 of the optical plug 20 supported by the annular grooves 4, 4 on the optical-plug receivers 3, 3 of the holder 2, and it is therefore unnecessary for the holder 2 to cover sites other than both the side surfaces of the optical plug 20 and other than lower parts of the distal end parts 22, 23 of the optical plug 20. For instance, a top surface of the plug and the bottom surface thereof except the distal end parts of the optical plug do not need to be covered by the holder at all. Provided that the optical transmitter unit 1 having a small height can be produced, the optical transmission device can be provided that has a height bearing comparison with heights (about 1 mm) of various surface mount components currently employed in portable electronic equipment.

Besides, the holding recesses 5, 5 provided in the holder 2 hold the optical plug 20 by being fitted on the protrusions 26, 26 of the optical plug side that are provided on the side surfaces of the optical plug 20, so that the optical plug 20 inserted in the direction generally at right angles to the optical axes of the optical transmitter unit 1 can easily be held.

Furthermore, the holder 2 is fixed by soldering onto the printed board with the metal plates 6 placed on the holder 2, and thus workability in the mounting can be improved.

Though there has been described the embodiment of the optical transmission device including the optical transmitter unit in which the light emitting element, the light receiving element, and the signal processing circuit are sealed with resin by transfer molding, the optical transmission device is not limited thereto and the invention may be applied to optical transmission devices including an optical transmitter unit in which either of a light emitting element or a light receiving element, or a light receiving element and a signal processing circuit are sealed with resin by transfer molding.

In the embodiment, the annular grooves 4, 4 as recesses are provided on the optical-plug receivers 3, 3 of the holder 2 and the annular protrusions 24, 25 of the optical plug side are provided on the distal end parts 22, 23 of the optical plug 20, respectively. Recesses on the holder and protrusions on the distal end parts of the optical plug, however, may have shapes not annular and there may be employed a holder having protrusions and an optical plug having recesses. Similarly, protrusions may be substituted for the holding recesses of the holder, and recesses may be substituted for the protrusions of the optical plug.

Though there has been described the embodiment of the optical transmission device in which the holder 2 is fixed by soldering onto the printed board via the metal plates 6, the optical transmission device of the invention may be mounted not only on a printed board but also on other members.

Figure 5A:
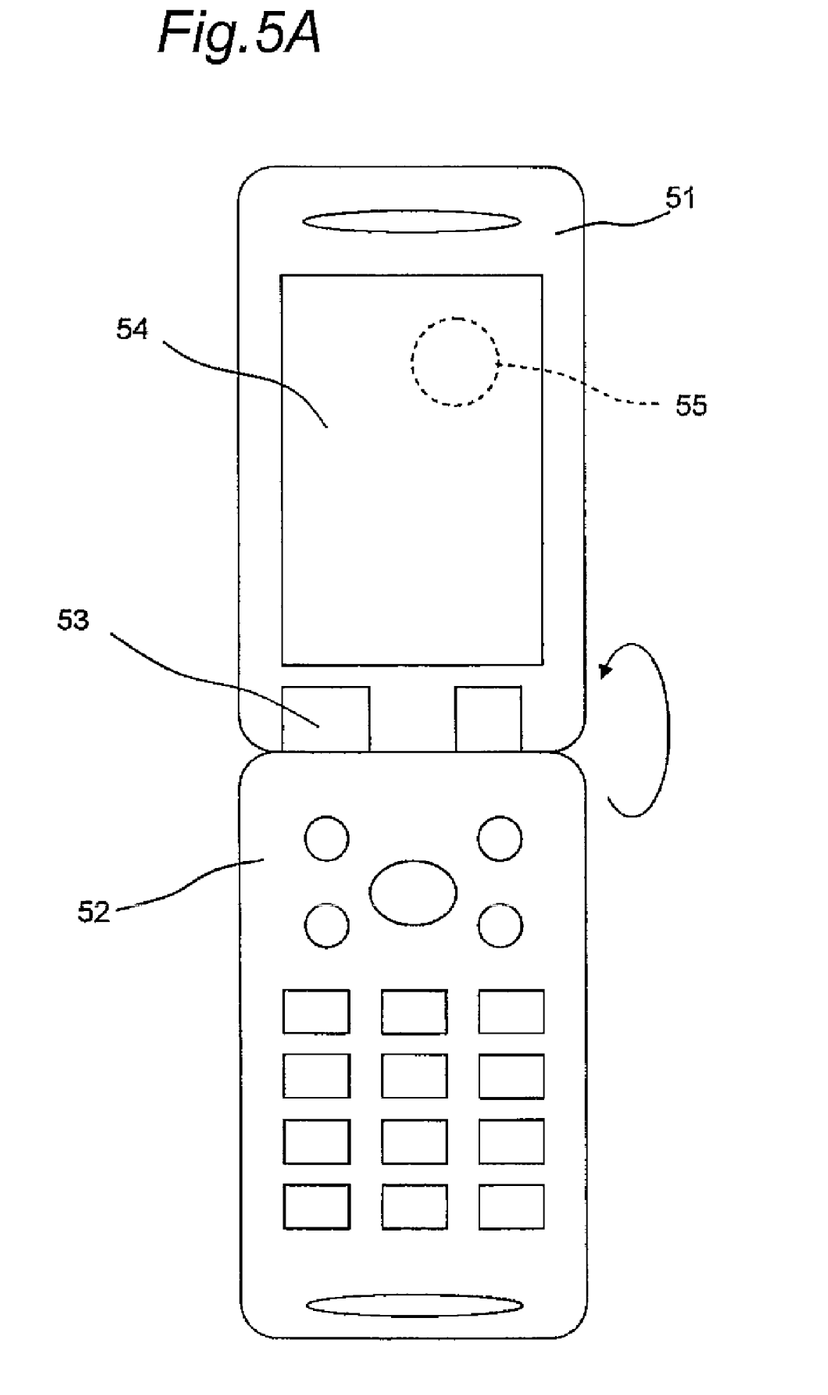
FIG. 5A is a front view of a portable telephone using the optical transmission device and the optical plug.
Figure 5B:
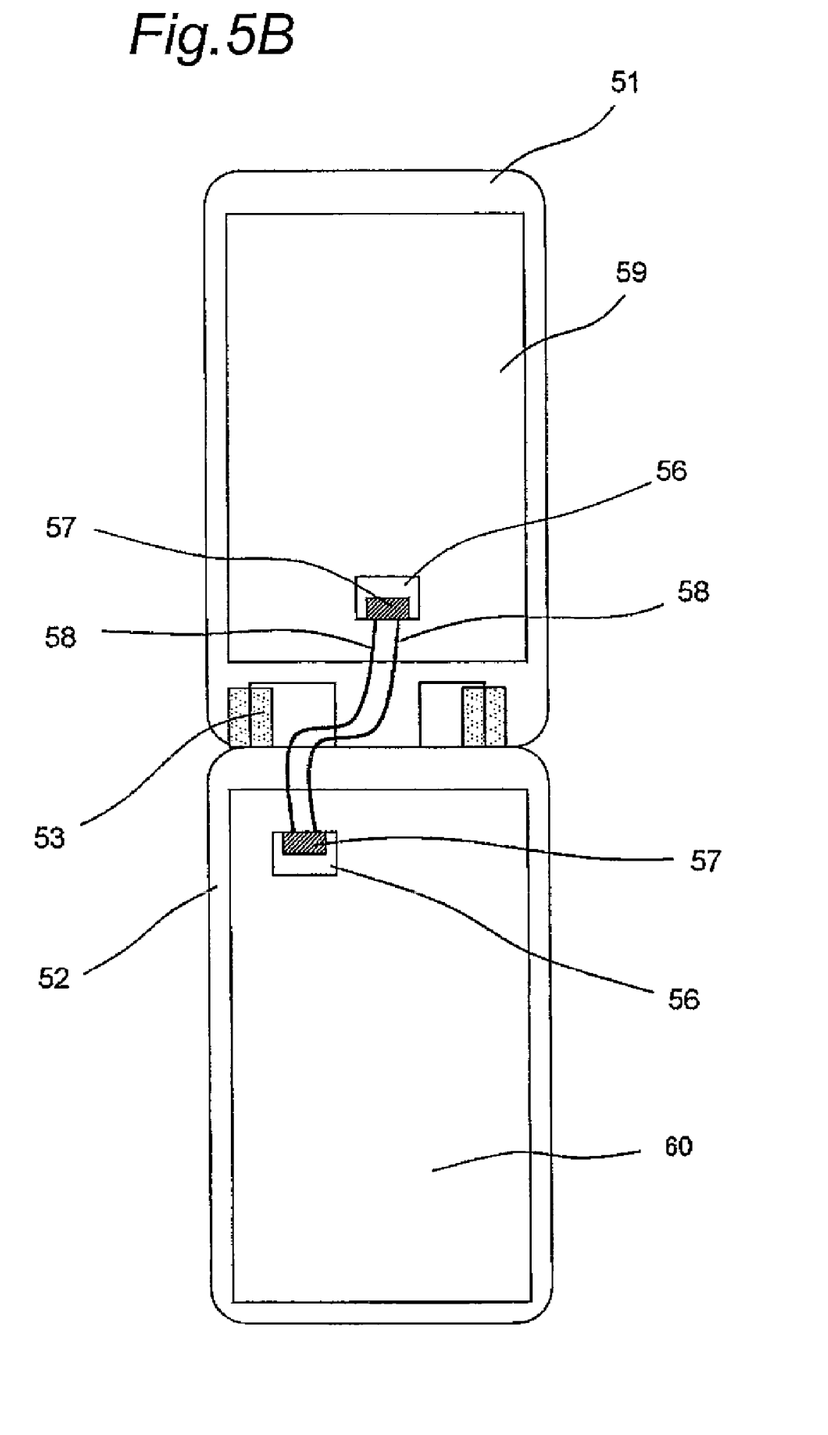
FIG. 5B is a schematic front view for illustrating an internal configuration of the portable telephone shown in FIG. 5A.
Figure 5C:
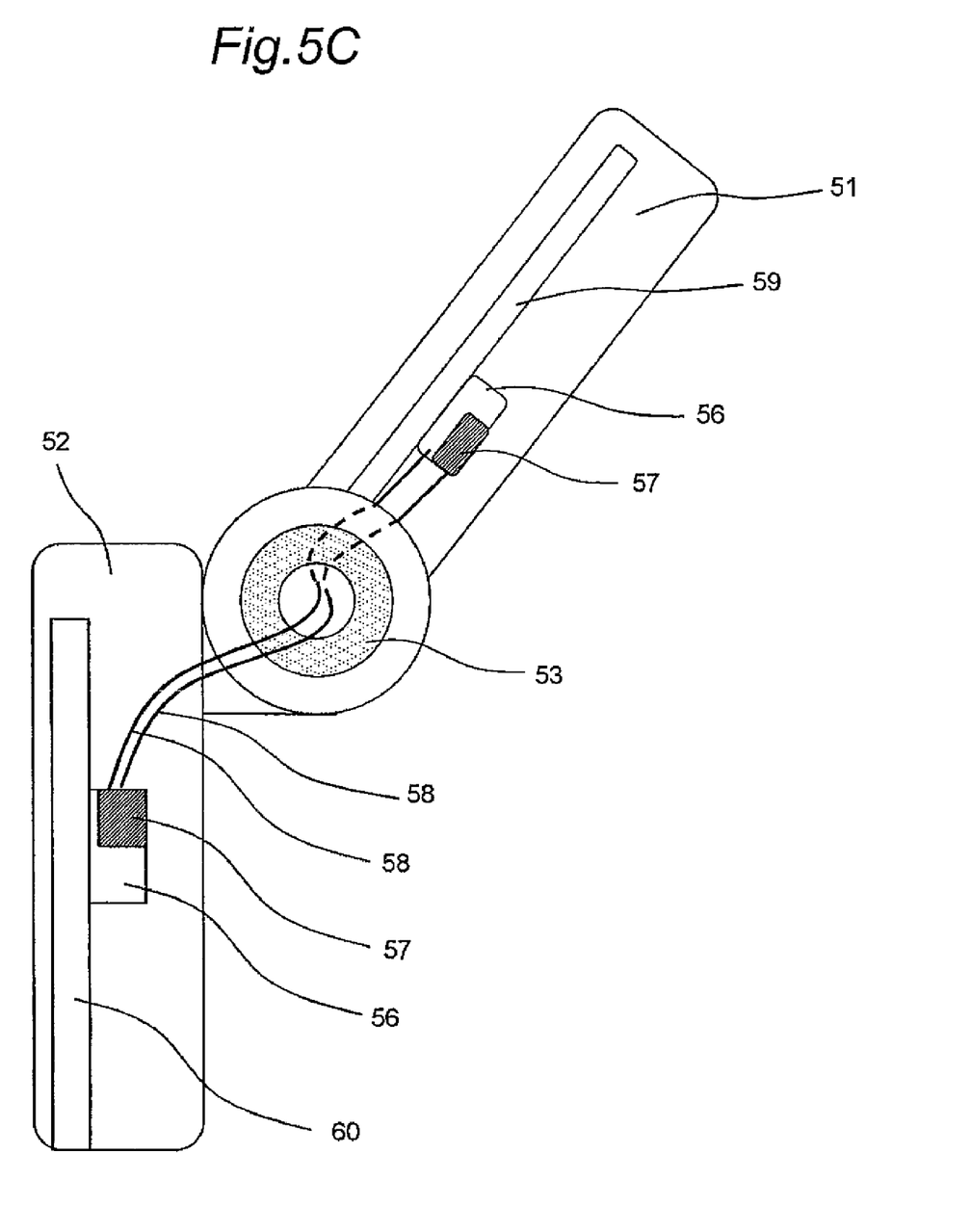
FIG. 5C is a schematic side view for illustrating the internal configuration of the portable telephone.

FIG. 5A shows a front view of a portable telephone as an example of electronic equipment. FIG. 5B shows a front schematic view for illustrating an internal configuration of the portable telephone shown in FIG. 5A, and FIG. 5C shows a side schematic view for illustrating the internal configuration of the portable telephone. FIGS. 5A, 5B, and 5C show an expanded state in a structure basically similar to common portable telephones of folding type.

As shown in FIG. 5A, the portable equipment has a first enclosure 51, a second enclosure 52, and bending hinge parts 53 for connection between the first enclosure 51 and the second enclosure 52. In the first enclosure 51 is provided a display part 54. A camera 55 is provided on a rear surface of the first enclosure 51 opposed to the display part 54. There may be provided a plurality of the display parts 54 and a plurality of the cameras 55 in the equipment. The camera may be provided on a surface on which the display part is provided. The second enclosure 52 has an operation panel including buttons or the like.

As shown in FIGS. 5B and 5C, a first main board 59 is provided inside the first enclosure 51. A second main board 60 is provided inside the second enclosure 52. Signal transmission between the first main board 59 and the second main board 60 is executed by means of optical signal. Connectors 56 each holding a package fitted therein in which a light emitting element and a light receiving element have been sealed with resin are provided on the first main board 59 and on the second main board 60, and one connector 56 and the other connector 56 are electrically connected with the first main board 59 and the second main board 60, respectively. The connectors 56 are connected to each other through optical transmission media 58 having optical plugs 57 connected to both ends thereof and thereby perform signal transmission.

In the portable telephone having the above configuration, single-core plastic optical fibers are used as the optical transmission media. In order to enable duplex communication between the first main board 59 and the second main board 60, two single-core plastic optical fibers are provided and are fixed to the optical plugs 57 each molded integrally. In the portable telephone of the embodiment, the optical transmission device 10 shown in FIG. 1 is used as the connector 56, and the optical plug 20 shown in FIG. 2 is used as the optical plug 57.

In the portable telephone of the embodiment, duplex communication is performed via connection using an optical cable with plugs in which both ends of two single-core plastic optical fibers are integrally molded. Provided that only simplex communication is required, however, there may be provided only one single-core optical fiber. In this configuration, the one optical fiber cable may be provided with optical plugs, the first enclosure may have the connector 56 holding a package fitted therein in which a light emitting element or a light receiving element has been sealed with resin, the second enclosure may have the connector 56 holding a package fitted therein in which a light receiving element or a light emitting element has been sealed with resin, and the connection and optical signal transmission may be effected through the one single-core optical fiber.

The optical transmission device of the invention may be applied to not only to portable telephone but also to other electronic equipment such as PDA (Personal Digital Assistant). In such electronic equipment using the optical transmission device of the invention, a reduction can be achieved in size and thickness thereof.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An optical transmission device comprising:
    an optical transmitter unit in which at least either of a light emitting element and a light receiving element are sealed with resin by transfer molding, and
    a holder which holds the optical transmitter unit being contained therein and which holds an optical plug being fitted therein with an optical fiber cable fixed to the optical plug and having a deformable side surface,
    the optical plug being inserted into the holder from a direction generally at right angles to optical axes of the optical transmitter unit, and
    metal members which hold the optical plug within the holder by taking up elastic deformation of the side surface of the holder caused by insertion of protrusions or recesses of an optical plug side of the optical plug into the holder.

2. An optical transmission device as claimed in claim 1, further comprising:
    recessed receivers that are provided in the holder so as to be suited to shapes of distal end parts of the optical plug, and
    recesses or protrusions provided on the holder that fit in the protrusions or recesses of the optical plug side provided on the distal end parts of the optical plug,
    wherein, upon insertion of the optical plug into the holder from the direction generally at right angles to the direction of the optical axes of the optical transmitter unit, optical axes of the optical plug coincide with the optical axes of the optical transmitter unit as a result of fitting the distal end parts of the optical plug in the recessed receivers of the holder, and the optical plug is set in a specified position in the direction of the optical axes as a result of fitting the recesses or protrusions on the holder in the protrusions or recesses of the optical plug side provided on the distal end parts of the optical plug.

3. An optical transmission device as claimed in claim 1, wherein
    holding recesses or holding protrusions are provided on the holder so as to fit the protrusions or recesses of optical plug side provided on at least a portion of side surfaces of the optical plug and so as to hold the optical plug.

4. An optical transmission device as claimed in claim 2, wherein
    the holding recesses or holding protrusions are provided on the holder so as to fit protrusions or recesses of optical plug side provided on at least a portion of side surfaces of the optical plug and so as to hold the optical plug.

5. An optical transmission device as claimed in claim 1, wherein
    the metal members fix the holder onto a printed board by soldering and are provided in the holder.

6. An optical transmission device as claimed in claim 2, wherein
    the metal members fix the holder onto a printed board by soldering and are provided in the holder.

7. An optical transmission device as claimed in claim 3, wherein
    the metal members fix the holder onto a printed board by soldering and are provided in the holder.

8. An optical transmission device as claimed in claim 4, wherein
    the metal members fix the holder onto a printed board by soldering and are provided in the holder.

9. Electronic equipment using the optical transmission device as claimed in claim 1.

* * * * *